June 15, 1965
G. DUCHANGE
3,189,516
METHOD OF MANUFACTURING INK-FREE PULP WITH UNBROKEN
FIBRES FROM RECLAIMED PAPER
Filed June 26, 1961
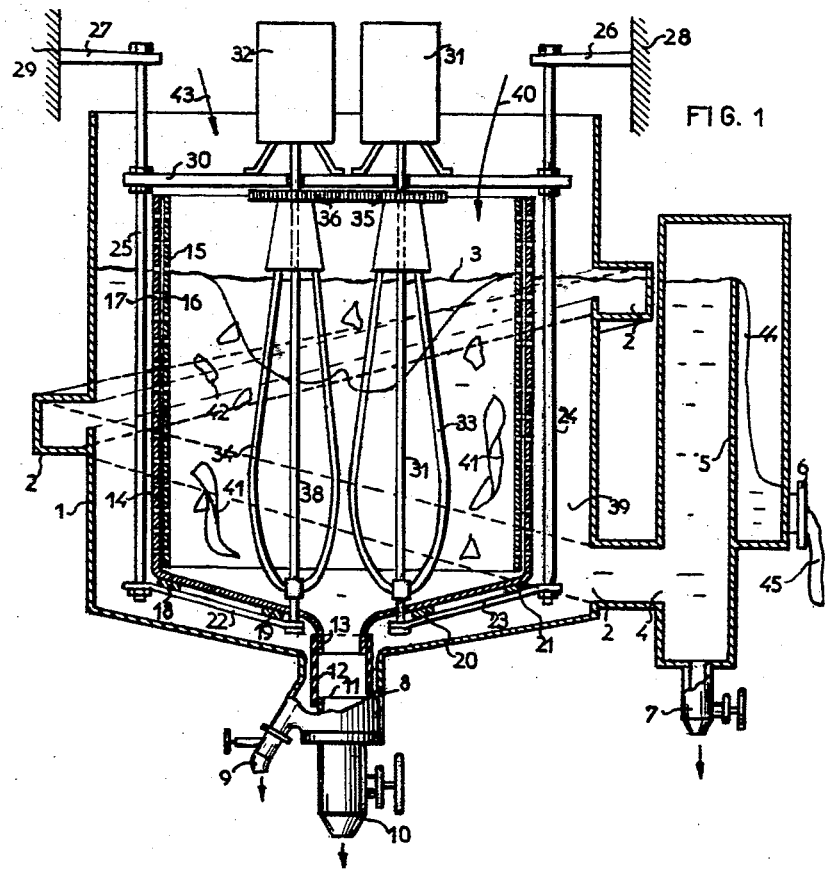
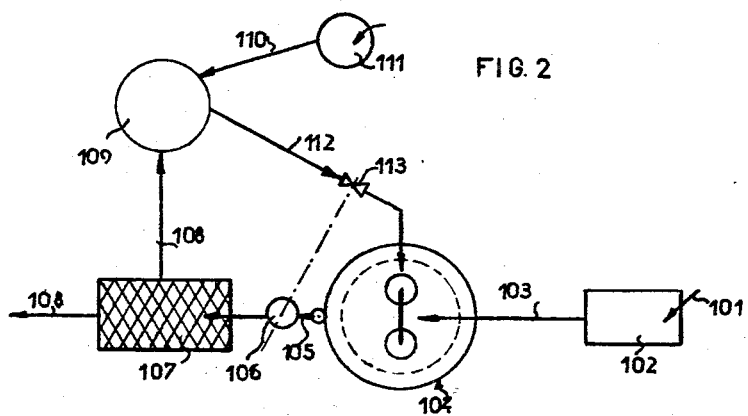

United States Patent Office 3,189,516
Patented June 15, 1965

3,189,516
METHOD OF MANUFACTURING INK-FREE PULP WITH UNBROKEN FIBRES FROM RECLAIMED PAPER
Guillaume Duchange, 16 Place du Marche, Neuilly-sur-Seine, France
Filed June 26, 1961, Ser. No. 119,549
Claims priority, application France, June 30, 1960, 831,591; June 15, 1961, 864,991
4 Claims. (Cl. 162—6)

The present invention relates to a method of manufacturing ink-free pulp with unbroken fibres from waste paper bearing printed, handwritten or typewritten patterns and dyed in its body, painted or otherwise coloured with colouring matter, such paper being designated hereinafter by the term of "inked paper." The invention also has for its object a processing tank especially adapted to this method; another object of the invention is the ink-free, light-coloured, homogeneous and indelible paper pulp with unbroken fibres, obtained from reclaimed paper, according to the invention.

Numerous methods have already been proposed for converting waste paper and more especially inked paper such as newspapers and other paper printed in black and/or colour into paper pulp that can be used again to manufacture paper for various uses. In general, however, methods used heretofore have not allowed paper of a commercial quality to be obtained on an industrial scale. As a general rule, the fibres in paper pulps obtained by known methods are badly treated and broken during the processing, thereby considerably lowering the efficiency of the operation and enabling only paper of mediocre quality to be obtained. This drawback is further accentuated when a conventional bleaching treatment is performed with a view to obtaining a pulp which is at least comparatively white. Lastly, the methods resorted to hitherto do not give entirely satisfactory results with colour-printed paper such as that used in currently sold magazines and other illustrated papers, due to the fact that the dyes and pigments incorporated in coloured inks are generally harder to eliminate than are particles of carbon black from black inks. For this reason, the waste paper pulps produced from old inked paper that are currently available in the trade at competitive prices are of low quality, are tinted in varying degrees of grey or other hues, and are not greatly appreciated. The known methods resort to coction operations and to prolonged processing easily lasting an hour, using relatively highly concentrated solutions (tensio-active or not) to obtain mechanical fibre separation, such treatments being generally combined together in costly plant comprising beating engines or breakers, the efficiency of which is caused to be enhanced by the addition of an abrasive agent such as lime or silica in the pulp undergoing processing.

The method according to the invention enables these drawbacks to be overcome and white or uniformly tinted pulps with unbroken fibres to be obtained with relatively highly diluted processing solutions, the processing time being very short in comparison with conventional methods.

The method of manufacturing ink-free waste paper pulp from old inked paper in accordance with the invention consists in causing the said paper to undergo, under atmospheric pressure, at least one processing in a tank containing a diluted aqueous solution of a de-inking agent which facilitates separation of the fibre-colouring particles, the quantity by weight of the said solution being over twenty times greater than that of the paper and its temperature being included between 8 and 40° C. approximately, in setting up in said solution swirling streams the strength of which is at least enough to maintain the paper in suspension in the solution, in pursuing the swirling treatment until the paper fibres are dispersed through the solution in the form of pulp, in drip-drying said pulp, in rinsing it in water and in then spin-drying the ink-freed pulp thereby obtained.

By way of a de-inking agent, one may conveniently use bicarbonate of soda in a concentration of one to five parts in a thousand by weight, the pH of the solution being included between eight and ten approximately.

According to a preferred embodiment, the paper concentration in the dry state is of the order of 4%, the processing time being about four to five minutes, during which time the solution is maintained at a temperature of around 25° C.

In an alternative embodiment, suitable when it is desired to obtain a very white pulp, the pulp obtained by the method in accordance with the invention may be processed in the presence of bicarbonate ions, by means of a chlorinated and diluted aqueous solution having a pH comprised between approximately eight and ten, the quantity by weight of which is over twenty times greater than that of the fibres in the dry state and its temperature included between about 8° and 40° C., the total concentration of reactive substances in said solution being of the order of 1 to 2% by weight. The mixture of pulp and solution is then agitated in order to render it homogeneous, the processed pulp being then allowed to rest before it is drip-dried, rinsed in water and the whitened pulp thereby obtained finally spin-dried.

With a solution at about 25° C., the useful agitating time is of the order of five minutes and the resting time about fifteen minutes for a fibre concentration of about 4% by weight as referred to the dry state.

In such a bleaching treatment according to the invention, it is advantageous to introduce a very small quantity of alkaline chloride, of the order of 0.5 part per thousand, into the chlorinated aqueous bicarbonate solution.

According to a further variant on the method according to the invention, treatment of the waste paper and bleaching of the paper pulp are combined into a single operation, the processing solution being both chlorinated and bicarbonate-bearing and the total concentration of reactive agents in said solution being of the order of one to five parts in a thousand by weight.

By way of a de-inking substance for use with paper which is particularly strongly inked, use may also be made, according to the invention, of an alkaline carbonate in the presence of a tensio-active compound, the total concentration of reactive agents in the solution being of the order of two to three parts in a thousand by weight, and the pH of the solution being included between approximately 8 and 10. The paper concentration may conveniently be 4% by weight, as calculated in the dry state. When such is the case, it is advantageous to process the pulp subsequently in a bicarbonate-bearing and if necessary chlorinated solution, as indicated precedingly, in order to obtain a bleached pulp having fibres that are more downy and swollen.

Plaster can also be used as the de-inking agent. When such is the case, roughly equal quantities of plaster and waste paper are used, in conjunction with an overall plaster paper concentration of about 4% by weight.

The use of plaster alone gives a pulp of mediocre appearance which is better suited to the manufacture of cardboard or packing sheets than to that of commercial-quality paper. On the other hand, it enables even paper most resistant to reclaiming to be processed rapidly without detrimental effect to the fibres. The plaster can be combined with advantage with one of the processing means referred to above, to wit, bicarbonate-bearing, chlorinated, or carbonate-bearing solutions and combinations thereof. In such cases a pulp of excellent quality is obtained, even from the hardest-to-process papers.

The ink extracted from the processed paper is often very difficult to eliminate from the de-inking solution, which also contains fibres originating from the processed paper. These ink particles remain in suspension or from a very troublesome froth, for the fibres tend to float on the surface of the de-inking solution, thereby preventing perfectly white pulps from being obtained.

A variant on the method according to the invention permits easy separation of the ink particles, by reason of the fact that the latter precipitate in the processing bath. The ink is thus easy to eliminate, so that processing is made particularly rapid.

This variant consists in lacerating the inked paper, in placing it in suspension in a diluted aqueous de-inking solution containing borax, in breaking up the paper and in processing it with an aqueous diluted solution of a bleaching agent belonging to the group comprising chlorinated lime and phosphoric acid, in then thoroughly washing the bleached pulp with water and in finally spin-drying the white paper pulp obtained thereby.

The breaking-up operation can be performed in the de-inking solution, in water, or in the bleaching bath.

The aqueous de-inking solution can contain borax in the proportion of 0.5 to 10 gr. approximately per liter and a wetting agent in the proportion of not more than 1 gr. per liter. A convenient de-inking solution will contain, per liter, about 1 to 5 grams of borax and 0.2 gram of a wetting agent consisting of a mixture of do-decylbenzene-sulfonate of sodium and sulfated copra alcohols of sodium. This solution is employed at a temperature of between 12° and 37° C. approximately, in a condition of slow agitaiton that is nonetheless sufficient to maintain the lacerated paper and the fibres derived therefrom in suspension.

The bleaching can be accomplished between 12 and 37° C. by bubbling through a quantity of air that is at least sufficient to keep the pulp in suspension in an aqueous solution containing less than 1 gram per liter of chlorinated lime liquor at 70 chlorometric degrees.

A very white pulp can also be obtained by adding orthophosphoric acid up to pH 7 to the pulp in suspension in the water.

According to still another variant of the method according to the invention, the pulps processed by means of bicarbonate and/or chlorine containing solutions in accordance with the invention may be uniformly and indelibly coloured by simply treating them in highly diluted aqueous acidic solutions, at substantially ambient temperatures, and in very short times of the order of one minute. Thus, phosphoric acid gives a salmon-pink, pulp, phosphoric acid with a trace of caustic soda gives a creamy-yellow pulp and potassium dichromate or iron sulfate a green pulp.

A particularly advantageous embodiment of the invention consists in effecting the processing by means of a solution in which there is generated simultaneously at least two disitnct swirling currents in the form of oppositely rotating eddies.

To manufacture the waste paper pulp according to the invention it is advantageous to effect the processing in a tank equipped with an egg-beater type of agitator, said tank being devoid of any sharp edges in the area in which the processing takes place.

A continuous form of processing can be achieved with a processing tank comprising a leakproof outer casing and two inner concentric casings of smaller diameter which are provided with perforations and are adjacent to each other, one of said perforated casings being movable in relation to the other and being susceptible of immobilization at will in a predetermined position, thereby enabling the size of the passageways, provided through opposite casing perforations to be controlled. The paper is introduced into the central part of the tank, and only after being shredded is it able to pass through the perforations before being discharged in the form of a fluid plup through the annular space between the outer casing and the perforated casings. The latter may be subjected with advantage to vibration, which tends to assist passage of the pulp through the perforations.

The method according to the invention is particularly well-suited to a continuous processing plant in which the processing solutions are recycled and collected in a storage and decanting tank on exit from the station where the processed pulp is drip-dried, and reintroduced into the processing tank after their reactive-agent content has been readjusted, the supply of solution to the processing tank being controlled by means which are sensitive to the fibre concentration in the fluid pulp emerging from the processing tank.

The invention will be more clearly understood from the detailed description which follows with reference to the accompanying drawings, which illustrate, by way of example and not of limitation, two possible embodiments of the invention.

In the drawing, FIG. 1 is a fragmentary diagrammatic section view of a tank for processing waste paper according to the invention.

FIG. 2 is a highly schematic illustration of a plant for the continuous manufacture of paper pulp from waste paper, according to the invention.

Waste paper (newspapers, magazines and other printed matter in black and/or in colour) can be processed in its existing condition provided that its size not too large, but it is often preferable to break it up with a view to obtaining paper strips about 20 mm. wide, say (or paper triangles having sides of about 15 cm. length).

The processing operations in solution can be performed either charge by charge or continuously, in a tank having a useful capacity of about 200 litres and made entirely of some thermo-plastic material of the vinyl chloride type, an example being a material known by the trade name "Afcodur."

This tank (FIG. 1) comprises an outer leakproof casing 1 having an outer spiral conduit 2 the upper end of which projects beyond the level 3 of the liquid contained in the processing tank and the bottom end of which debouches at 4 into a kind of overflow weir 5. A flange 6 enables the outlet of this weir to be connected to a discharge pipe, while a drain cock 7 located at the bottom of said weir 5 permits drainage for maintenance, cleaning or reconditioning purposes. The base of the tank 1 is conical in shape and terminates in an axial tube 8 fitted with a lateral drain cock 9 and an axial drain valve 10 which extends into the tube 8 in the form of a tubular portion 11 of smaller diameter.

This tubular extremity 11 is connected, via a flexible coupling 12 (such as a pipe made of rubber or some synthetic elastomer), to the funnel-shaped bottom end 13 of a casing 14 also made of vinyl chloride but which is smaller than the outer casing 1. A third casing 15, likewise in vinyl chloride, is provided with perforations and disposed inside the casing 14. The casing 15 is substantially tubular in shape and its outer diameter is but slightly less than the inner diameter of the casing 14, thereby ensuring that casings 14 and 15 are substantially contiguous. The casing 15 is rotatable inside the casing 14 and means (not shown) enable it to be immobilized in the desired position. Thus the perforations 16 in the casing 15 can be brought opposite the perforations 17 in the casing 14 or be moved out of coincidence therewith, as required, thereby permitting a passageway of the desired size to be formed across opposite perforations. The casing 14 rests on cushions 18, 19, 20, 21, made of rubber or some synthetic elastomer, for example. These cushions are themselves supported on chords 22, 23 fixed to the ends of tie-rods 24, 25 which are themselves secured to brackets 26 and 27 rigidly connected to fixed members 28, 29 of some supporting structure or masonry. The cross-member 30 fixed to the tie-rods 24, 25 supports two motors 31, 32 driving bow-shaped beaters 33 and 34 respectively. Two meshing gearwheels 35, 36 ensure synchronism in the motion of the beaters 33, 34. Two parallel and vertical shafts 37, 38, rotatably supported by their ends on the chords 22, and 23, respectively, ensure correct functioning of the rotating compound within the device.

This form of assembly nonetheless involves a cantilevering, since the perforated casings 14 and 15 as well as the assembly comprising the rotating parts and their drive motors are supported only by the brackets 26, 27. Thus, the vibraions inherent in the operation of such beaters are transmitted to the perforated casings 14 and 15.

As a specific example, it is possible to build a tank having a cylindrical outer casing about one meter in diameter. The annular space 39 between the casing 14 and the casing 1 has a radial width of 120 mm. The gap between the shafts 37 and 38 is 200 mm. The maximum width of the beaters 33 or 34, measured at right angles to its shaft 37 or 38, is 190 mm., which leaves a passageway of at least 10 mm. between the two beaters 33 and 34 when they are closest to each other. Each of the motors 31, 32 has a power rating of 1.5 H.P. and its rotational speed is of the order of 1500 r.p.m. The outer diameter of the casing 14 is 760 mm. The height of the casing 1 is about one meter and that of casings 14 and 15 about 650 mm. The height of the spiral conduit 2 is about 150 mm. and its width 100 mm. The perforations in the casings 14 and 15 consist of vertically disposed rectangular ports about 30 mm. deep and 8 mm. wide, spaced at vertical intervals of about 5 mm. and horizontal intervals of about 8 mm. The weir 5 consists of two vertical tubes having their top ends connected by an elbow-shaped section. The vertical ascending branch, which is connected at 4 to the conduit 2, has a diameter of about 200 mm. and a height of about 900 mm., while the vertical descending branch has a diameter of about 150 mm. and a height of about 750 mm. The inner diameter of the tubular portion 11 and of the end 13 of casing 14 is about 100 mm., while the diameter of the tubular portion 8 is about 120 mm. The assembly is carried on a supporting structure (not shown).

In operation, the first step is to fill the apparatus with the processing solution, the paper being then introduced into the central part, as shown by the arrow, 40 after the motors 31 and 32 have been started up. The setting to be used for the beaters 33 and 34 is by no means a critical one, but particularly good results are obtained when they are set symmetrically.

As the motors rotate, two oppositely spinning eddies are set up inside the apparatus, and these eddies entrain the paper strips 41, first reducing them to smaller pieces such as 42, then into the fibre state. At that point, the fibres can pass through the perforations 16, 17, and penetrate into the annular space 39 in the form of a fluid pulp. This fluid pulp also penetrates into the conduit 2 and into the ascending branch of the weir 5. If, then, the processing solution be introduced into the apparatus in the direction of the arrow 43, together with a corresponding quantity of fresh strips of paper, then the liquid level will rise inside the apparatus and the fluid pulp will overflow, as shown at 44, into the descending branch of the weir 5 and be evacuated either in direct fashion as indicated at 45, or through a pipe connected to the flange 6. In cases where the apparatus stops functioning or operates charge by charge, the valve 10 enables the mixture of solution, fibres and possibly also of paper strips contained within the casing 14 and 15 to be emptied, while the cocks 7 and 9 permit drainage of the pulp or solution contained in the lower part of the apparatus. The conduit 2 prevents accidental sedimentation of the pulp within the annular space 39.

*Example 1*

An aqueous solution is used, having a pH of 9.5 and containing for each liter, 2 g. of sodium carbonate and 0.10 g. of a neutral tensio-active solution (pH=7) having a fatty alcohol sulfate and alkyl-aryl-sulfonate base, such as that sold under the trade name "Heliopon AS" by the Sinnova Company. If necessary, the solution is heated to 25° C. (by non-illustrated conventional means) and said solution is maintained at that temperature throughout the operation. The motors are then started up and the strips of paper (from old newspapers) heavily charged with ink are introduced into the solution until the proportion of paper reaches 4%, i.e. 8 kg. per 200 liters of solution. The treatment is continued for four or five minutes, after which the pulp formed is evacuated and dried in a conventional hydro-extractor. The pulp is rinsed in clear water of up to pH=7. A paper pulp of uniformly whitish hue with unbroken fibres is thereby obtained, in which no colored pigment whatsoever can be detected. In the course of the operation, there may be formed, on the surface of the solution, a strongly colored froth containing a major part of the pigments and the other constituents of the ink or inks having served to print the reclaimed paper undergoing processing. Although it is by no means indispensable, it is preferable to separate this froth from the pulp when the latter is extracted from the apparatus. This separation involves no difficulty, regardless of whether operation is continuous (in which case the pulp alone discharges via the weir 5) or charge by charge (in which case the pulp is decanted, so to speak, through the cocks 7 and 9 and the valve 10). All that is necessary is to shut off the cocks and the valve before the colored layer can pass through.

*Example 2*

For processed paper in which the ink is particularly resistant (colored magazines, painted paper), the method is the same as in Example 1, except that 4 kg. of plaster are added into the apparatus together with 4 kg. of paper, making equal quantities by weight of paper and plaster. The plaster evacuates without difficulty with the rinsing water, thereby leading to the obtainment of a paper pulp the quality of which is substantially comparable to that obtained in Example 1.

*Example 3*

8 kg. of old newspapers (bearing few illustrations) are processed in the same way as in Example 1, but with an aqueous solution at pH=9 containing only 2 gr. of bicarbonate of soda per liter. After the final rinsing, there is obtained a substantially white pulp with unbroken fibres, having a swollen and downy appearance.

The same operation is repeated, first using typewritten paper in conjunction with a solution containing 1 gr. of sodium bicarbonate per liter, then publicity journals with a solution at 5 gr. per liter. In each case a pulp is obtained whose quality is substantially identical to that obtained previously with 2 gr. per liter.

*Example 4*

The drip-dried but unwashed pulp obtained in Example 3 is introduced into 200 litres of an aqueous solution at ph=9.5, containing only 1.5 gr. of chlorinated lime per liter, at approximately 25° C. After thorough mixing by agitating, the solution is allowed to rest for about a quarter of an hour. It is then decanted and the pulp is allowed to drain, after which it is rinsed in water of up to pH=7, then spin-dried. There is thereby obtained a downy pulp of beautiful quality, having swollen, unbroken and very white fibres.

*Example 5*

An aqueous solution is prepared, containing 1.5 gr. of sodium bicarbonate and 2 gr. of chlorinated lime per liter. This solution is maintained at about 25° C. throughout the processing, and there are introduced into it whole reclaimed newspapers in a proportion of 8 kg. of paper per 200 litres of solution. The latter is agitated for four to five minutes, then left to stand for fifteen minutes. The pulp thereby obtained is then extracted from the processing tank, allowed to drain, washed in water up to pH=7, then spin-dried. This gives a very white downy pulp having unbroken fibres and a uniform hue.

The same treatment can be applied to the pulp obtained in Examples 1 and 2. This time the pulp is spin-dried but not rinsed, and in this way a very white downy pulp of very beautiful appearance can again be obtained.

*Example 6*

The operations described in Example 3 are repeated, this time adding 0.50 gr. of sodium chloride (NaCl) into each litre of solution, which enables an even whiter pulp to be obtained in a given processing time.

The same improvement can be obtained by proceeding in the same way with pulps prepared in the manner described in Examples 4, 5 and 6.

*Example 7*

An aqueous solution at 25° C. is prepared, each litre of which contains 2 gr. of sodium carbonate, 0.5 gr. of "Heliopon AS", 0.75 gr. of bicarbonate of soda and 1 gr. of chlorinated lime. The waste paper is then processed as described in Example 1, by agitating it for four or five minutes, then allowing it to rest for fifteen minutes before evacuating the pulp obtained, letting it drain, then spin-drying it after rinsing in water of up to pH=7. This gives a pulp of a quality comparable to that obtained in Example 5.

*Example 8*

The operation in Example 7 is repeated, but with 4 kg. of heavily inked paper and 4 gr. of plaster, thereby leading to the obtainment of a pulp of a quality comparable to that obtained by the method in Example 5.

*Example 9*

The operations in Example 7 are again repeated, but this time adding 0.25 gr. of sodium chloride per liter of solution. This gives a pulp which is nearly as white as that obtained in Example 6.

*Example 10*

The operations in Example 9 are repeated, but with 4 kg. of heavily inked paper and 4 kg. of plaster. This gives a pulp almost as white as that obtained in Example 9.

*Example 11*

4 kg. of miscellaneous waste inked paper and 4 kg. of plaster are introduced into the processing tank filled with 200 litres of water at about 30° C. After processing by agitation until a homogeneous suspension is obtained, the pulp is allowed to drain, then rinsed abundantly in clear water. This gives a slightly greyish pulp the fibre sizes of which are substantially similar to those of the original reclaimed paper, and this pulp is eminently suitable for the manufacture of thin cardboard or grey packing paper.

A subsequent treatment in a bicarbonate solution will give a whiter and downier pulp having fibres that are more swollen than in the original paper. This pulp can be bleached and colored as previously indicated.

*Example 12*

An aqueous solution is prepared, containing, in each liter, 1 gram of borax and 0.2 gram of a wetting agent such as that sold under the trade name "Heliopon AS" by the Sinnova Company. Into 100 liters of this solution at a temperature of about 18° C. (said temperatures being maintained constant throughout the processing) there is introduced 2.5 kilograms of old newspapers which have previously been lacerated into fragments having an average area of some 100 square centimeters. The operation is performed in a tank equipped with a slow agitator which maintains the pieces of paper in suspension. After some fifteen minutes have elapsed, the paper will be virtually ink-free. It is then removed and the de-inking bath recovered. The paper is simply allowed to drain and then broken up in water by agitation in a tank equipped with two agitators of the rotary egg-beater type. In the tank used to recover the de-inking bath, the ink particles and the charging agents that were contained in the paper are decanted and settle at the bottom. The pulp consisting of the broken-up paper is collected and incompletely rinsed in water. Analysis will show that the pulp still contains traces of borax.

This pulp is then placed in a highly diluted aqueous solution of chlorinated lime, obtained by adding 50 cubic centimeters of a commercial-type chlorinated lime liquor at 70 chlorometric degrees to 100 litres of water at about 18° C. Air is bubbled through the solution for one to five minutes in sufficient quantity to stir the mass. After letting it stand, the pulp is rinsed thoroughly in water, then spin-dried. This gives a very white paper pulp with downy fibres the quality of which is superior to that of the fibres in the initially used newspaper. This pulp makes it possible to manufacture paper of a quality greater superior to that of the original paper.

*Example 13*

To an old-paper pulp, obtained by de-inking illustrated magazines in accordance with some conventional method (using plaster, for instance), there are added 5 grams of borax per liter to the de-inking bath at the end of the processing. The ink settles, whereupon the pulp is allowed to drain and then summarily washed, after which the bleaching operation is carried out.

To this end, phosphoric acid in a proportion of about 0.5 to 1 gram per litre, approximately, is added to the pulp in suspension in water at up to pH=7.

In a few seconds the pulp becomes remarkably white. Optionally, the pulp may be rinsed in water once before spin-drying. The ultimate pH value of the pulp will be substantially equal to 7.

*Example 14*

In this case use is made of a paper pulp which is bleached with chlorine and drip-dried, but not rinsed, as obtained in any one of Examples 4 to 13. This pulp is introduced into an aqueous solution at 15° C, each litre of which contains 0.06 gr. of phosphoric acid of density 1.6, titrating 75% of $p^2O^5$ by analysis. 200 litres of phosphoric solution are used for a quantity of drip-dried pulp corresponding to 8 kg. of paper fibre in the dry state. After agitating for one minute, the fibres are indelibly and uniformly colored salmon-pink. The pulp is left to drain, then washed in water and spin-dried, as indicated previously.

*Example 15*

The operations in Example 14 are repeated, but with the addition of about 5 milligrams of sodium hydroxide into each liter of the solution. The pulp obtained is uniformly and indelibly creamy yellow in hue.

*Example 16*

The operations in Example 14 are repeated, but this time with a solution containing 0.05 gr. of potassium bichromate per liter of solution. This gives a pulp uniformly and indelibly almond green in color.

The same operations are repeated, but with solutions of increasing concentration containing 0.07 gr. then 0.10 gr. of potassium bichromate per liter. This gives pulps of a more accentuated green, ranging from sea-green to darker hues.

*Example 17*

The operations in Example 16 are repeated, but using iron sulfate ($So^4Fe$) instead of potassium bichromate, which gives roughly equivalent tinting.

The color baths used in Examples 14 to 17 can be reused, since they hardly lose their strength at all, the only loss being that incurred due to the retention, after spin-drying, of some of the solution by the fibres previously spin-dried after bleaching and before tinting.

It is easy to set up a continuously operating plant with the tank described above and illustrated in FIG. 1. In such a plant, as is shown in the diagram in FIG. 2 the reclaimed paper (newspaper, magazines, etc.) is introduced at 101 into a breaker 102 which converts it into strips, after which it is conveyed, as shown by the arrow 103, directly into a processing tank 104 similar to the one shown in FIG. 1. The pulp emerging at 105 passes through a concentration tester 106, of a type well known per se in the paper-making industry, which determines the proportion of fibres in the pulp. The pulp then reaches a drip-dryer 107 of the vibrating-screen type, before being evacuated, at 108, towards a spin-dryer, towards a washing and spin-drying station, or towards a second plant similar to the one shown in FIG. 2 but dispensing with the breaker 102, the pulp being subjected there to some subsequent processing operation such as bleaching or tinting. The processing solution which drains off is conveyed from the drip-dryer 116 to a storage tank 109 via a pipe 108. The drained solution remains in this storage tank 109 for a length of time sufficient to permit sedimentation of the major part of the short fibres that have passed through the screen in the dryer 107, together, where applicable, with the paster which is drained into the tank 104. The storage tank 109 receives make-up solution through a pipe 110 connected to a preparation tank 111 in which the required reactive agents are dissolved in water in the desired proportions, with a view to maintaining the concentration of said reactive agents constant in the processing solution. The decanted solution, the concentration of which is thus kept constant at some suitable value, is conveyed to the tank 104 by a pipe 112 the throughput of which is controlled by a servo-actuated valve 113 operated by the concentration regulator 106.

Such a plant permits the continuous and automatic processing of some 500 kg. or more of old newspapers or other printed paper hourly, and the obtainment of a paper pulp the quality of which is substantially equivalent to that which originally served to manufacture the reclaimed paper being processed.

The processing according to the invention enables at least 95% of the unbroken fibres contained in old paper to be reclaimed, and at the same time eliminates charging substances, glues or other foreign substances.

It is to be clearly understood that the invention is by no means limited to the specific examples described and illustrated hereinbefore, but that, without departing from the scope of the invention, it is susceptible of many modifications fully accessible to the specialist in the art, according to the type of application envisaged.

By way of example; the reactive agents entering into the composition of the solutions described precedingly may be replaced by other equivalent reactive agents well-known to chemists. Similarly, equivalent mechanical means, different from those described and illustrated, may be employed to set up swirling currents within the solution.

What is claimed is:
1. In a method of manufacturing pulp from reclaimed inked paper, the steps of providing an aqueous solution containing bicarbonate; lacerating said paper; introducing said lacerated paper into said bicarbonate solution at a temperature of substantially 25° C., the paper concentration in said solution being substantially 4%; processing said paper in said solution during 4 to 5 minutes by agitating said solution to disperse the fibres of said paper therein so as to form a pulp; draining said solution from said pulp, introducing the drained pulp into an aqueous diluted solution containing chlorine and having a pH value comprised between 8 and 10; said chlorine solution being maintanined at a temperature comprised between 8° and 40° C.; agitating the mixture of pulp and chlorine solution to render it homogeneous; allowing said mixture to repose; draining the chlorine solution from the bleached pulp thus obtained; introducing said pulp into an aqueous acid solution containing about 0.06 gr. of phosphoric acid per liter, at a temperature comprised between 8° and 20° C., the proportion of pulp in the acid solution being about 4% by weight, as evaluated on the basis of paper in the dry state; agitating the mixture of pulp and acid solution, to obtain a uniformly salmon-pink-tinted indelible pulp; and rinsing said tinted pulp in water until a pH value of 7 is obtained.

2. A method according to claim 1, further comprising the step of adding a few milligrams of sodium hydroxide per liter to said acid solution, whereby a creamy yellow-tinted indelible pulp is obtained.

3. A method as claimed in claim 1, wherein said phosphoric acid solution is replaced by a solution containing 0.05 to 0.10 gr. of at least one salt of the potassium hydroxide and iron sulfate type, whereby a uniformly green-tinted indelible pulp is obtained.

4. A method according to claim 1, wherein said step of agitating said solution is carried out by generating at least two distinct agitating currents in the form of oppositely rotating eddies in said solution.

References Cited by the Examiner
UNITED STATES PATENTS

| | | | |
|---|---|---|---|
| 417,470 | 12/89 | Chambers | 162—243 |
| 1,925,372 | 9/33 | Darling | 162—8 |
| 1,933,228 | 10/33 | Snyder | 162—8 |
| 2,083,884 | 6/37 | Wells | 162—60 |
| 2,310,415 | 2/43 | Frymoyer | 162—61 |
| 2,344,047 | 3/44 | Lowe | 162—243 |
| 2,394,273 | 2/46 | Thomas | 162—4 |
| 2,494,098 | 1/50 | Lochman | 162—61 |
| 2,916,412 | 12/59 | Altman | 162—4 |

OTHER REFERENCES

West: Deinking of Paper, pub. by Institute of Paper Chemistry, Appleton, Wis., April 1943, pp. 5–11.

Ellis: Printing Inks, Reinhold Pub., New York, N.Y., 1940, pp. 480–483.

DONALL H. SYLVESTER, *Primary Examiner.*

RICHARD D. NEVINS, MORRIS O. WOLK,
*Examiners.*